United States Patent
Robinson et al.

(10) Patent No.: US 8,286,559 B2
(45) Date of Patent: Oct. 16, 2012

(54) TROLLEY ASSEMBLY FOR PASSENGER RESTRAINT SYSTEM

(75) Inventors: Justin Robinson, Ellenton, FL (US); Brian Ford, Seminole, FL (US)

(73) Assignee: Conax Florida Corporation, St. Petersburg, FL (US)

( * ) Notice: Subject to any disclaimer, the term of this patent is extended or adjusted under 35 U.S.C. 154(b) by 111 days.

(21) Appl. No.: 12/580,827

(22) Filed: Oct. 16, 2009

(65) Prior Publication Data

US 2010/0170412 A1 Jul. 8, 2010

Related U.S. Application Data

(60) Provisional application No. 61/106,341, filed on Oct. 17, 2008.

(51) Int. Cl.
*E01B 25/22* (2006.01)
*B64D 25/02* (2006.01)

(52) U.S. Cl. .................. 104/94; 105/155; 244/1 R

(58) Field of Classification Search .......... 104/93, 104/94, 249, 250, 251, 252; 105/149.2, 150, 105/155; 182/3, 231–235; 244/1 R; 482/69
See application file for complete search history.

(56) References Cited

U.S. PATENT DOCUMENTS

| | | | |
|---|---|---|---|
| 4,208,970 A | 6/1980 | Matyas | |
| 4,801,105 A | 1/1989 | Frisk | |
| 5,016,318 A * | 5/1991 | Harris | 16/95 R |
| 5,458,550 A * | 10/1995 | Braim et al. | 482/69 |
| 5,636,807 A | 6/1997 | Warrick | |
| 6,058,849 A * | 5/2000 | Ostholt et al. | 104/93 |
| 6,315,138 B1 * | 11/2001 | Dyson | 212/336 |
| 7,112,022 B1 | 9/2006 | McLoughlin et al. | |
| 7,275,710 B2 | 10/2007 | VanDruff et al. | |
| 7,303,049 B1 * | 12/2007 | Greenlee | 182/37 |
| 7,850,026 B2 * | 12/2010 | McKay | 212/315 |
| 7,938,757 B1 * | 5/2011 | Cockrell | 482/69 |
| 2006/0189453 A1 * | 8/2006 | Leblond | 482/69 |
| 2006/0284012 A1 | 12/2006 | VanDruff et al. | |
| 2008/0224450 A1 | 9/2008 | Van der Vegt | |

* cited by examiner

*Primary Examiner* — S. Joseph Morano
*Assistant Examiner* — Zachary Kuhfuss
(74) *Attorney, Agent, or Firm* — GrayRobinson, P.A.; Michael J. Colitz, III

(57) ABSTRACT

Disclosed is a trolley assembly that is adapted to be used with a passenger restraint, such as a locking reel. The trolley assembly allows the reel lock to be securely positioned at any of a number of discrete locations along the length of an associated track. A mechanism is included for permitting the user to selectively lock and unlock the trolley as needed.

9 Claims, 9 Drawing Sheets

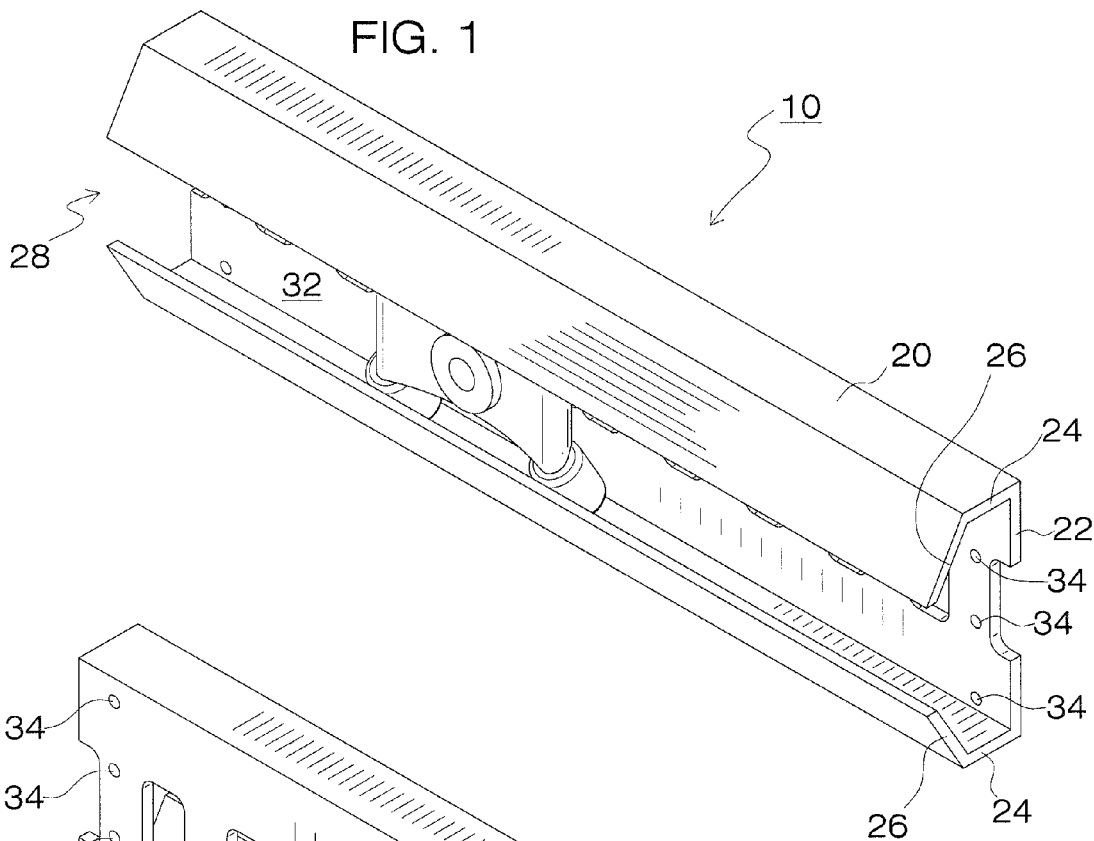
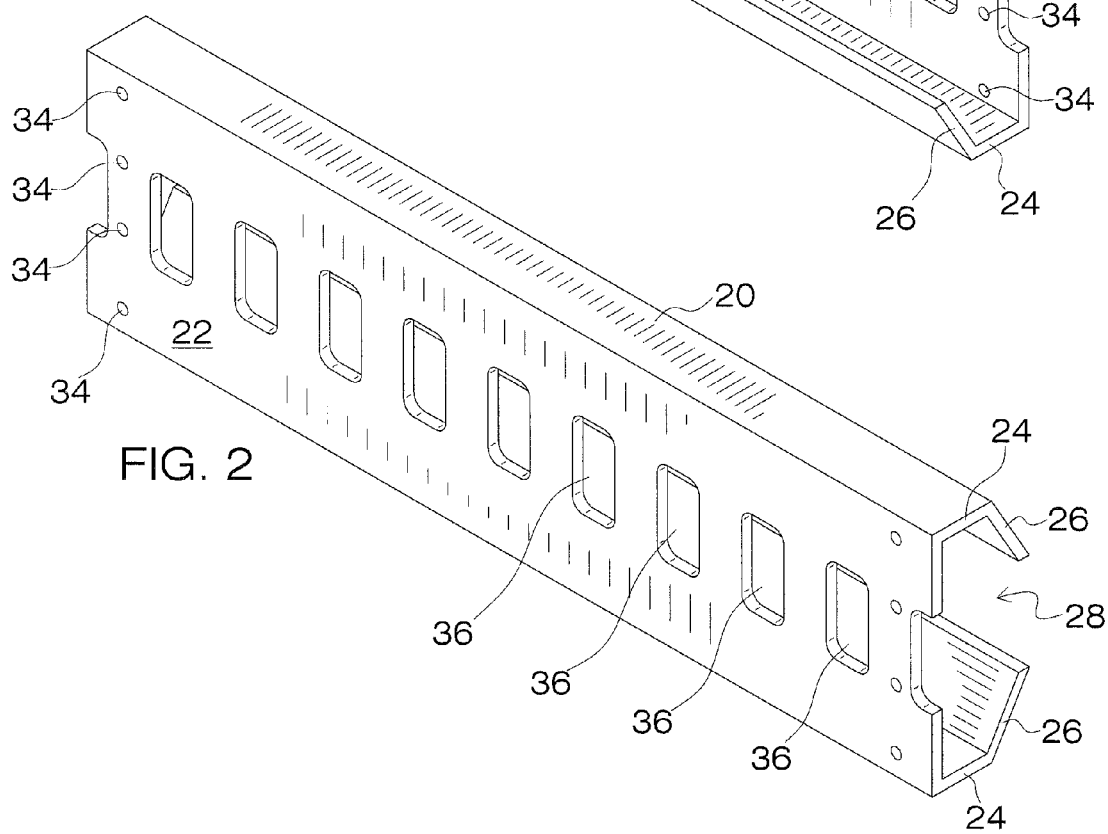

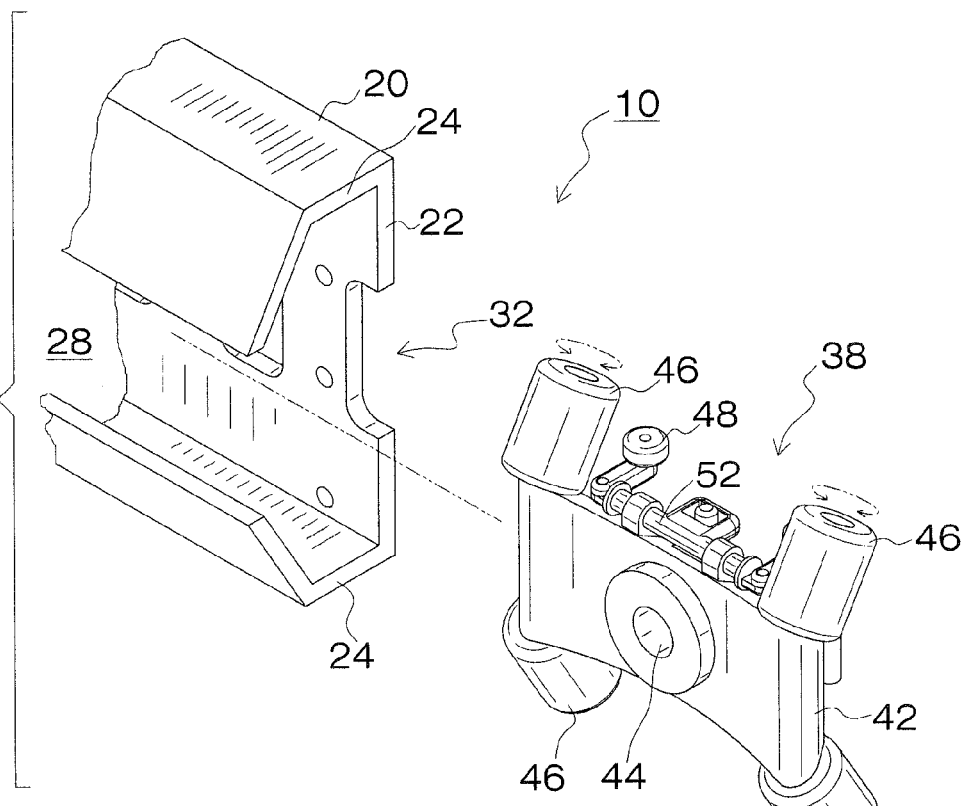
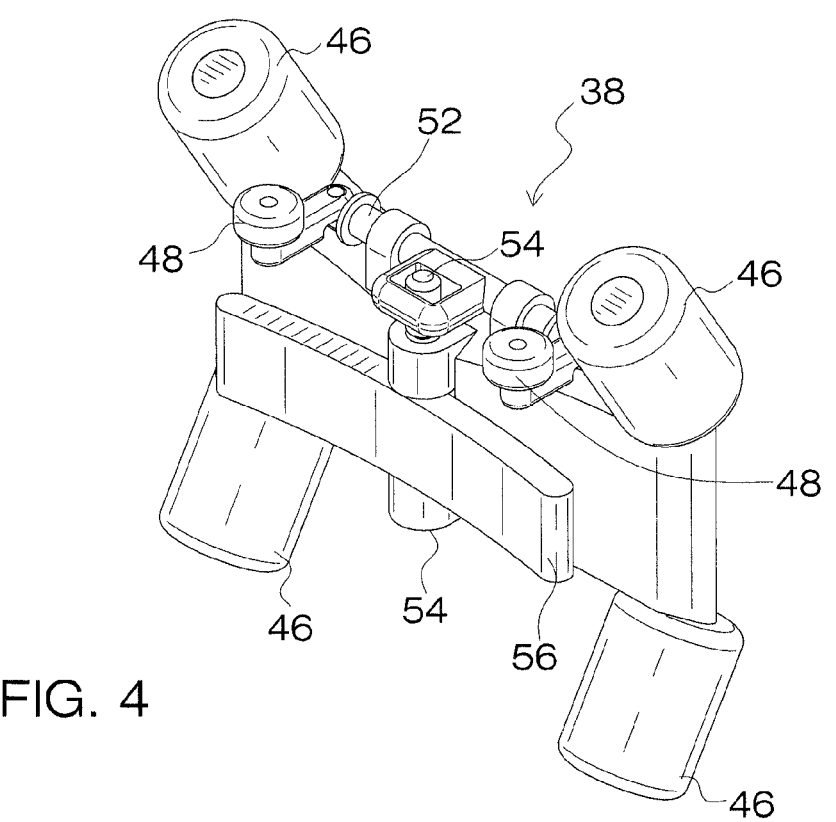
FIG. 3
FIG. 4

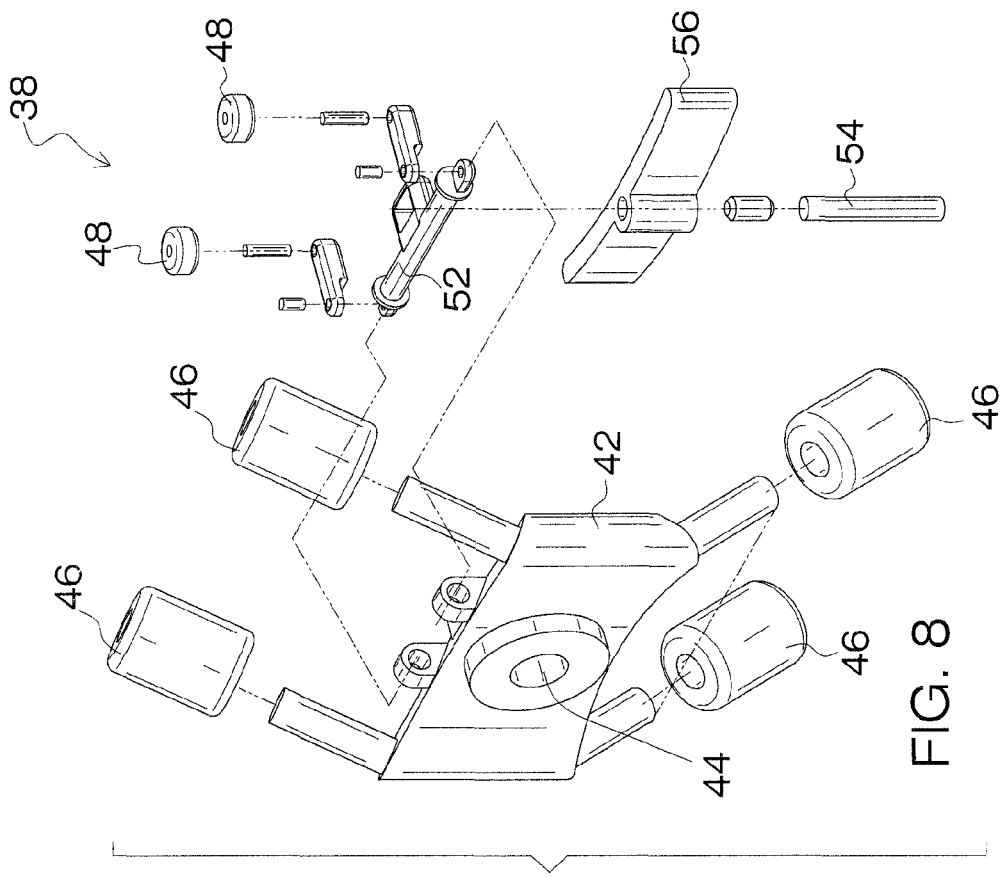
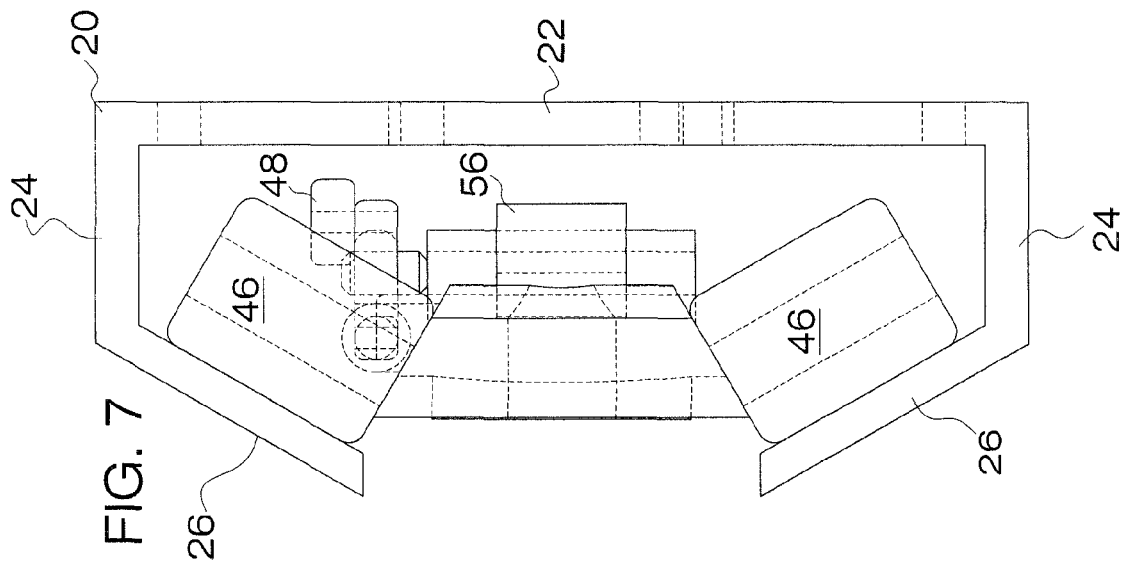

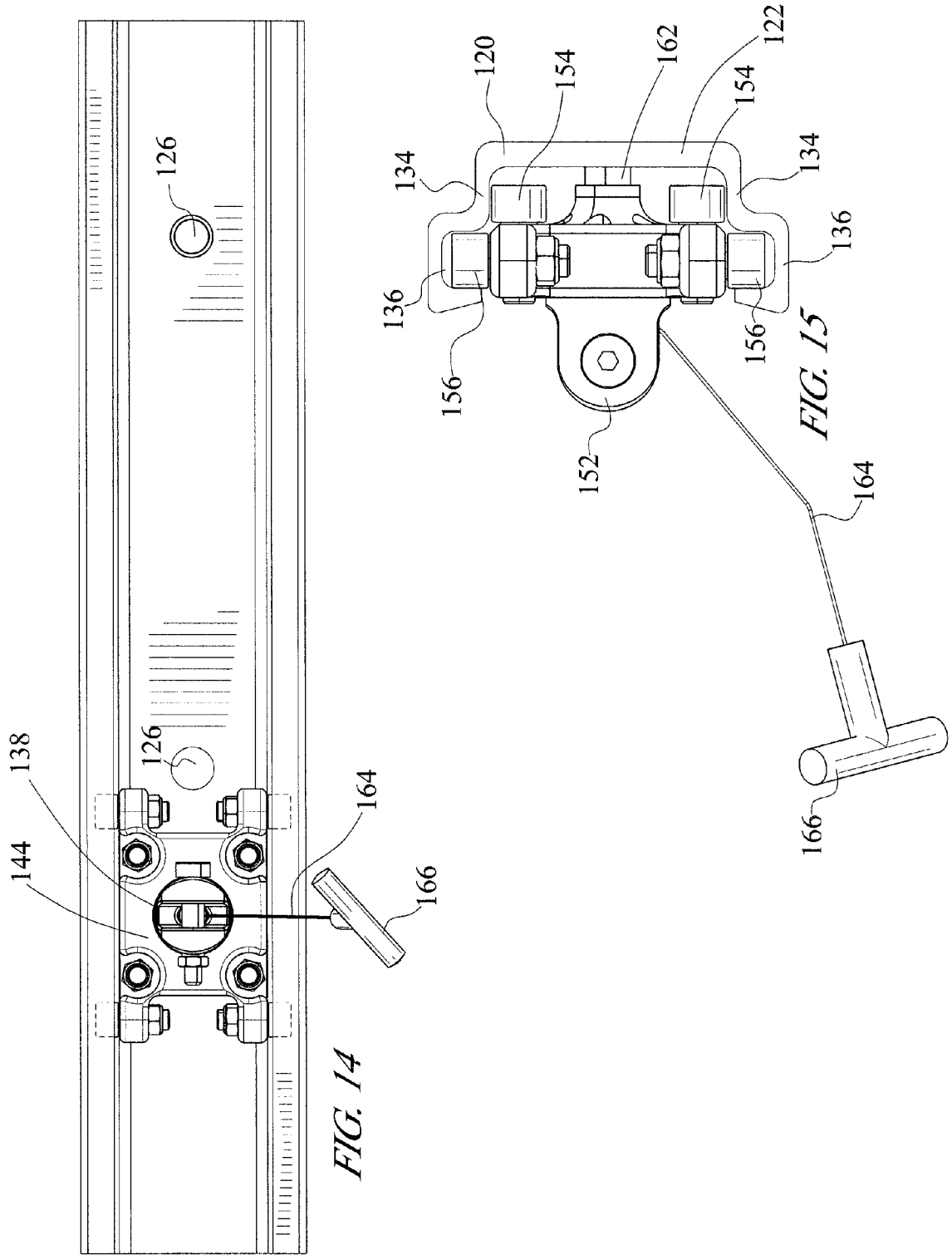

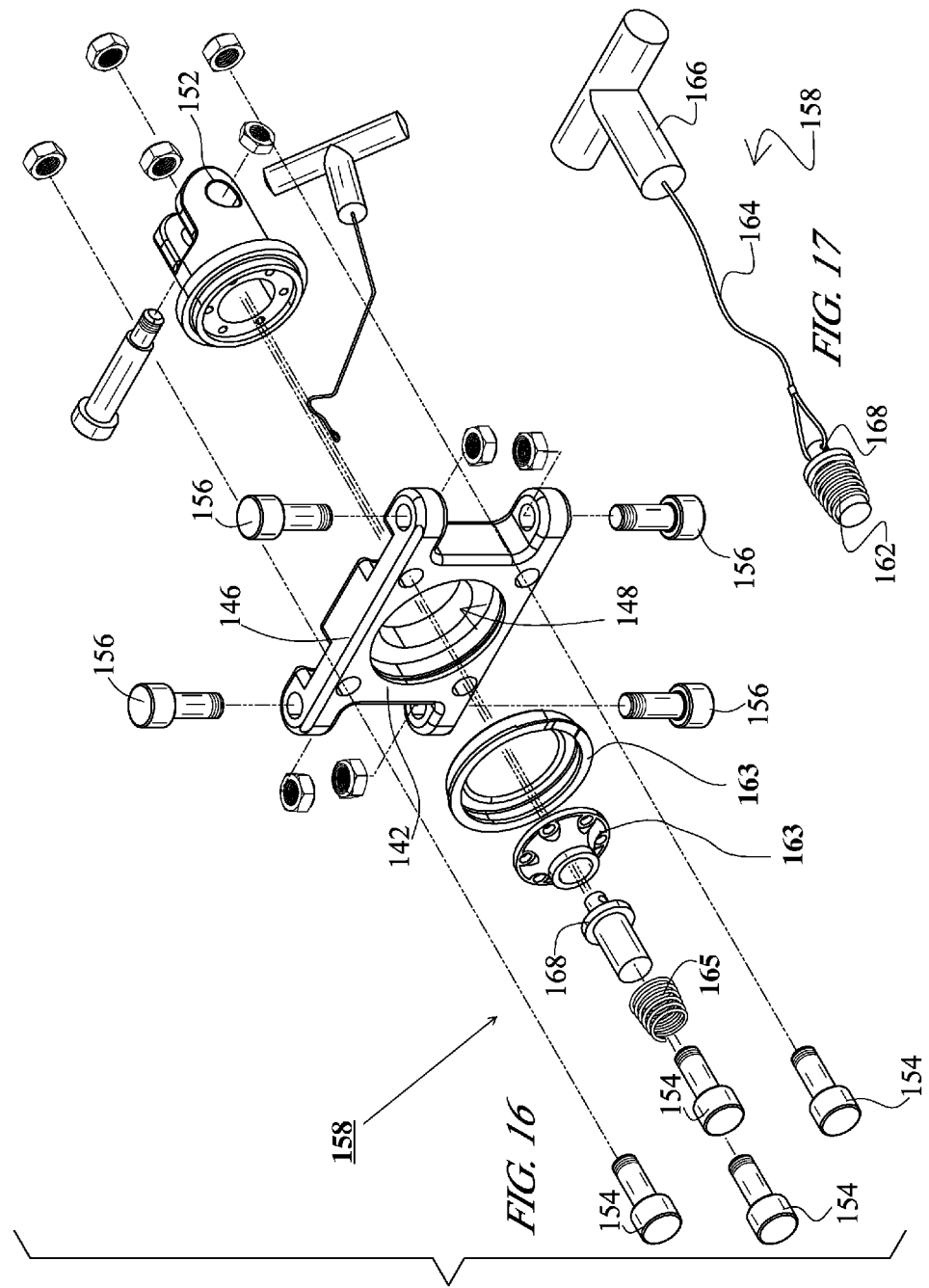

TROLLEY ASSEMBLY FOR PASSENGER RESTRAINT SYSTEM

RELATED APPLICATION DATA

This application claims priority to application Ser. No. 61/106,341 filed on Oct. 17, 2008 and entitled "Trolley Assembly with Toggle Type Locking Mechanism." The contents of this application are fully incorporated herein.

BACKGROUND OF THE INVENTION

1. Field of the Invention

This invention relates to a trolley assembly for use in conjunction with a passenger restraint system. More particularly, the present invention relates to a trolley assembly that can be removably connected to a reel lock and that employs a releasable locking mechanism.

2. Description of the Background Art

The present invention relates to a passenger restraint for the inside of a vehicle, such as fixed winged aircraft and helicopters. Occupants of these vehicles must often perform tasks during flight that require movement around the vehicle cabin. This is particularly true of military aircraft, wherein the occupant is often involved in strenuous movements, such as lifting cargo, tending to patients, or firing weapons. Many times these activities must be performed with little or no advanced warning.

All of this is problematic in that the occupant must be both mobile and yet restrained against aircraft movement. Unrestrained occupants can be seriously injured in the event of turbulence or other violent aircraft movement. Thus, there exists a need in the art for a restraint system that effectively prevents occupant injury but at the same time allows the occupant to freely maneuver within the vehicle.

As a result the foregoing, various types of restraint systems have been developed. One such system is described in commonly owned U.S. Pat. No. 7,275,710 to Van Druff et al. Van Druff discloses an aircrew restraint system that includes a track and a trolley that runs along the track. The trolley includes an interlock pin that cooperates with interlock hooks spaced within the track. A webbing strap connects an aircrew harness to a strap retractor. In order for the occupant to release the trolley, they must grasp an overhead handle.

Harness reels are also known in the art for use in connection with restraining a vehicle occupant. For instance, U.S. Pat. No. 4,801,105 to Frisk discloses a reel assembly for retracting and locking a shoulder harness.

The assembly includes a strap supporting spool affixed to a ratchet wheel. When a strap is rapidly pulled from the reel, an inertial mass turns with respect to the reel. This causes the inertial mass to move forward axially and trip a dog which locks the reel.

Likewise, U.S. Pat. No. 5,636,807 to Warrick discloses an acceleration sensor for an aircraft employing an inertial weight. The inertial weight is movable within a chamber by way of a linkage. The linkage is such that it provides the same output in response to movement of the aircraft in multiple directions.

Although these inventions each achieve their respective objectives, there continues to be a need in the art for improved trolley assemblies and associated locking mechanisms that can be easily triggered and released by the occupant. There also continues to be a need in the art for a trolley mechanism that easily attaches to existing harness reels.

SUMMARY OF THE INVENTION

It is, therefore, one of the objects of this invention to provide an improved mechanism for positioning a reel lock within the interior of a vehicle.

It is another object of this invention to provide an improved trolley mechanism that permits the reel lock of a passenger restraint system to be conveniently maneuvered throughout the interior of a vehicle.

It is another object of the present invention to provide an improved trolley assembly that includes an easily activated user restraint.

These and other objects are achieved by providing a trolley assembly employing a trolley and trolley rail. The trolley includes a mounting member and rollers. The rollers of the trolley are adapted to ride within a trolley way within the rail. The mounting member can be releasably secured to a supplementary restraint system, such as a harness wheel. The trolley also includes a retaining mechanism that includes a latch that can be selectively inserted into one of a series of detents within the rail. A handle is also included for permitting a user to engage or disengage the latch.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a perspective view of the trolley and trolley rail.

FIG. 2 is a perspective view of the trolley rail showing the interlocking apertures.

FIG. 3 is a perspective view of the trolley being inserted into the trolley rail.

FIG. 4 is a detailed perspective view of the trolley.

FIG. 7 is an end view of the trolley positioned within the trolley rail.

FIG. 8 is an exploded view of the trolley.

FIG. 14 is a top plan view of the additional embodiment illustrating the trolley within the trolley rail.

FIG. 15 is an elevational view of the additional embodiment with the trolley positioned with the trolley rail.

FIG. 16 is an exploded view of the trolley of the additional embodiment.

FIG. 17 is a detailed view of the release cable, handle, rotatable fitting and locking pin.

Similar reference characters refer to similar parts throughout the several views of the drawings.

DETAILED DESCRIPTION OF THE PREFERRED EMBODIMENT

Figure 5:
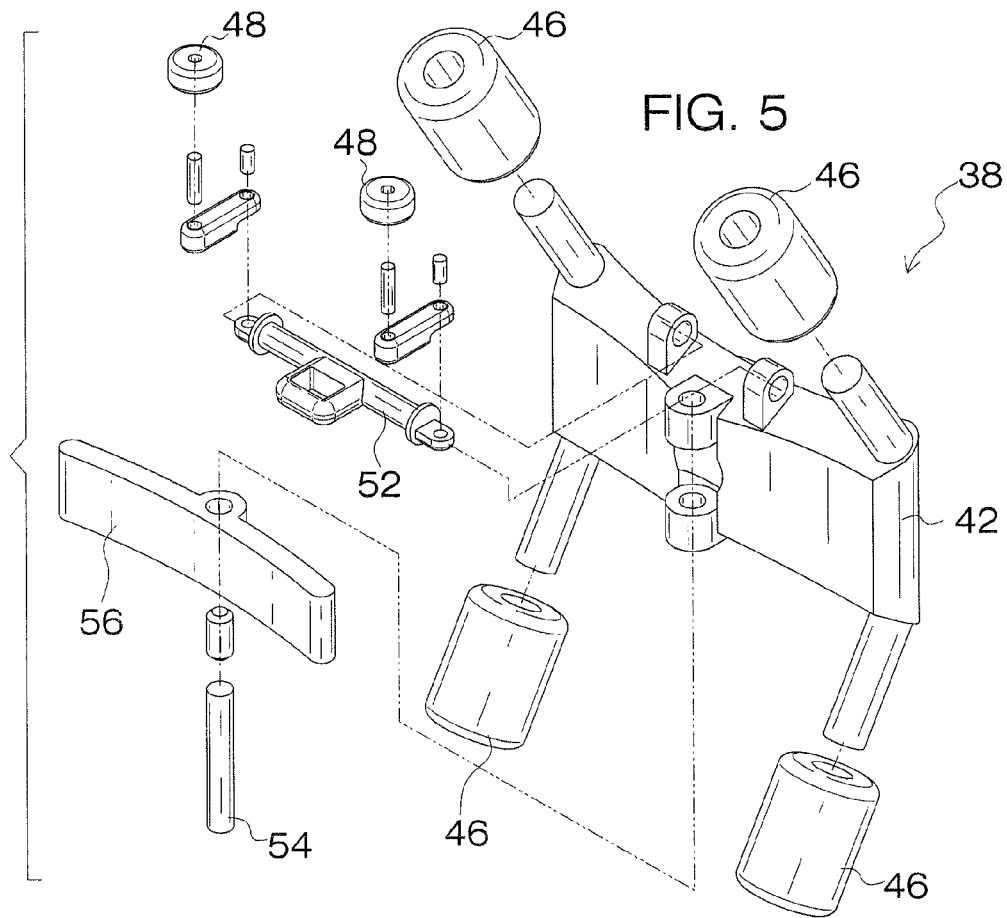
FIG. 5 is an exploded view of the trolley.
Figure 6:
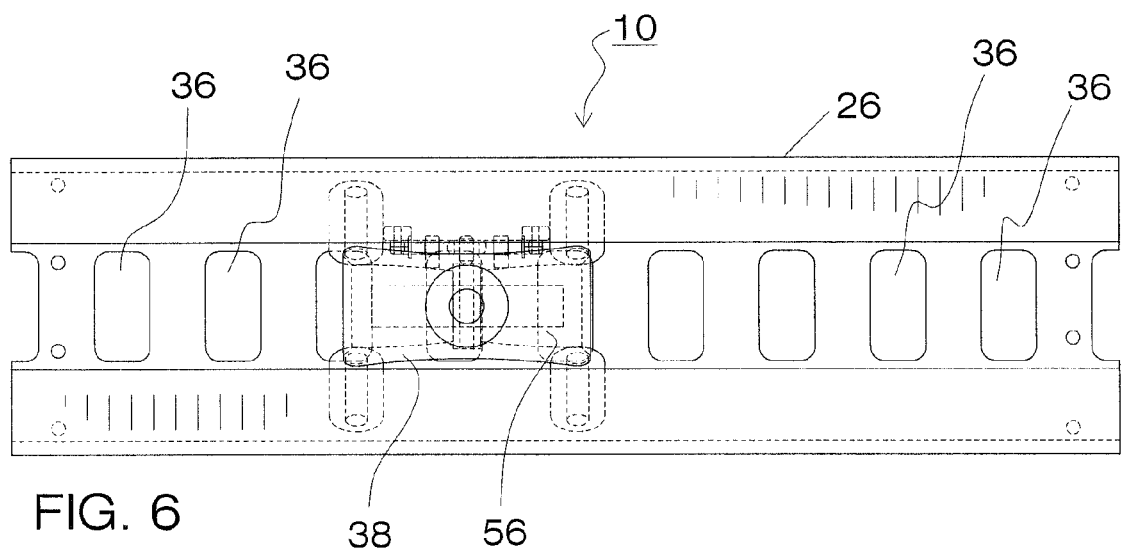
FIG. 6 is a cut away view showing the trolley positioned within the trolley rail.
Figure 9:
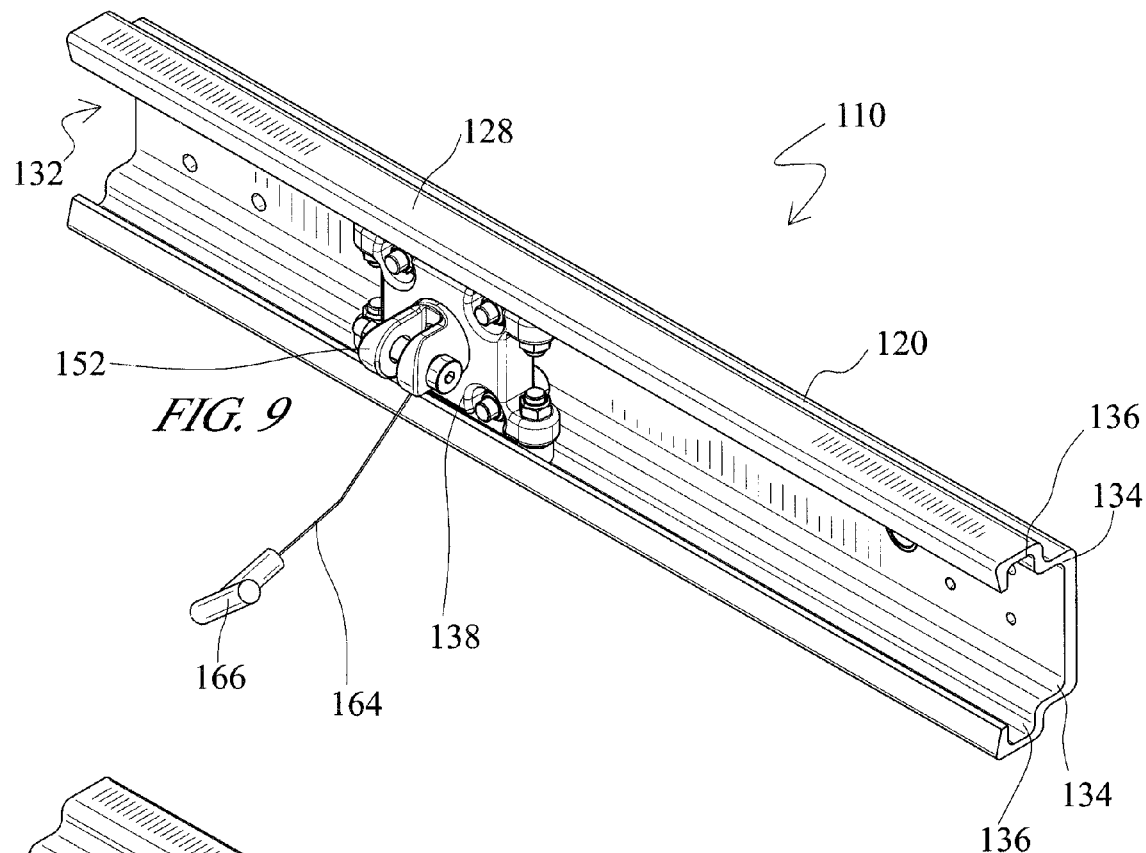
FIG. 9 is a perspective view of an additional embodiment of the trolley assembly.
Figure 10:
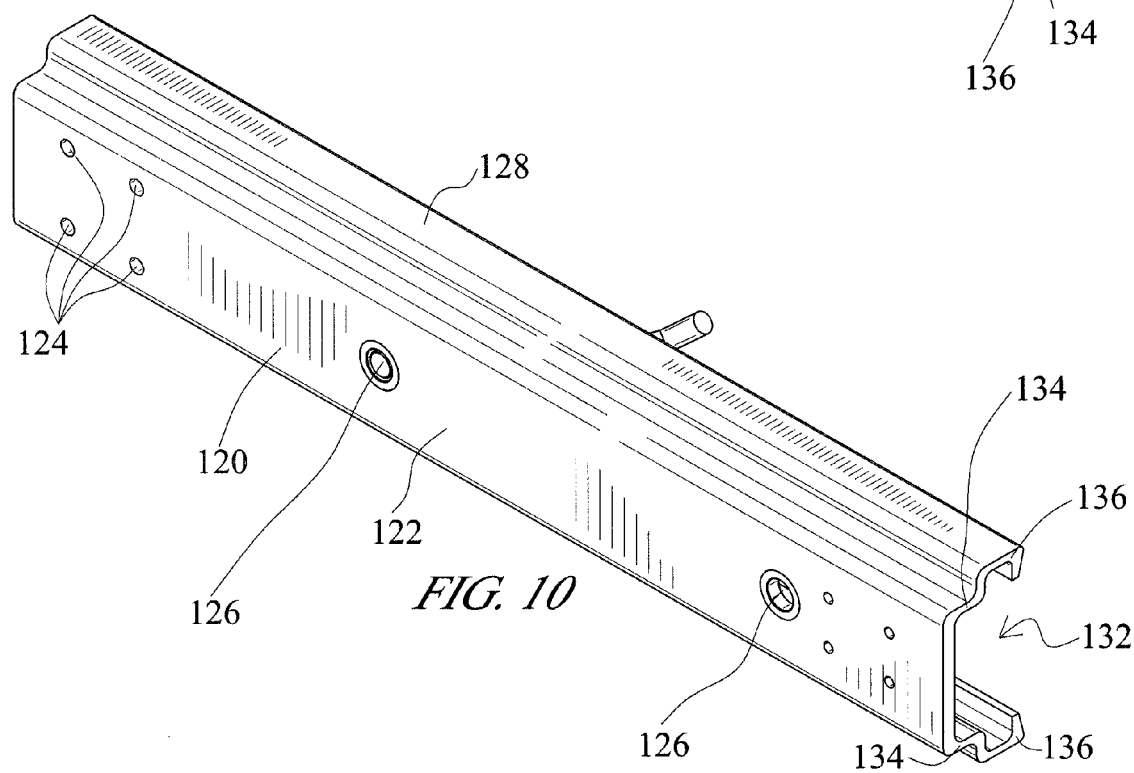
FIG. 10 is a perspective view of an additional embodiment of the trolley assembly.

Disclosed is a trolley assembly that is adapted to be used with a passenger restraint, such as a locking reel. The trolley assembly allows the reel lock to be securely positioned at any of a number of discrete locations along the length of an associated track. A mechanism is included for permitting the user to selectively lock and unlock the trolley as needed.

First Embodiment

The first embodiment of the present invention is illustrated with reference to FIGS. 1-8. The trolley assembly is suited for use in conjunction with the reel lock of an overhead passenger restraint system. The system allows the reel lock to be lockingly positioned at any of a number of discrete locations along the length of an associated track. A locking engagement is achieved by pivoting a toggle mechanism to any of a number of discrete orientations.

With specific reference to FIG. 1 the track and trolley mechanisms are depicted. As illustrated, the trolley rail 20 is adapted to be secured to the interior of a vehicle. For example, trolley rail 20 can be secured to the ceiling of an aircraft such as a helicopter. Trolley rail 20 is preferably installed anywhere a passenger would be traversing so as to allow the restraint system to travel with the user. One suitable aircrew restraint system that can be employed in conjunction with the present invention is the system described in commonly owned U.S. Pat. No. 7,275,710 to Van Druff, et al., entitled "Aircrew Restraint System," the contents of which are fully incorporated herein.

With continuing reference to FIG. 1, trolley rail 20 includes a base track 22 which is adapted to be secured to a ceiling or other surface via fasteners. Trolley rail 20 further includes upstanding side edges 24 and angled top edges 26. In the depicted embodiment, edges 26 are angled at approximately a 45 degree angle. However, the use of other angles is within the scope of the present invention. Angled edges 26 do not form a closed compartment, but are spaced from one another so as to create an opening 28. This opening 28 allows the reel lock (not shown) of the passenger restraint system to extend from the trolley rail 20. A suitable reel lock is described in commonly owned co-pending patent application Ser. No. 61/024,409, entitled "Reel Lock for Passenger Restraint Having Dual Locking Positions," the contents of which are incorporated herein by reference.

The edges of trolley rail 20 thereby create an internal trolley way 32 within which a trolley can be movably positioned, in a manner described in greater detail hereinafter. As noted previously, base track 22 is adapted to be secured to the interior surface of the vehicle. In this regard, mounting apertures 34 are formed within base to allow for the passage of threaded fasteners. Additionally, as noted in FIG. 2, base 22 also includes a number of equally spaced interlock apertures 36. These interlock apertures permit the trolley to be lockingly engaged at any of a number of discrete locations along the length of trolley rail 20. The exact manner in which such locking engagement is carried out is described in greater detail hereinafter.

With reference now to FIGS. 3 and 4, the trolley of the assembly 10 is described. As illustrated, trolley 38 includes a base 42 and further includes a reel lock mounting aperture of 44. The reel lock mounting aperture 44 is preferably centrally located within base 42 and may include male or female threads. These threads are adapted to accept the male or female counterpart of a locking reel (not shown). Again, a suitable locking reel is described in commonly owned U.S. Application Ser. No. 61/024,409, entitled "A Reel Lock for Passenger Restraint Having Dual Locking Positions." Thus the mounting aperture 44 allows the reel lock to be conveniently replaced and/or repaired without having to remove trolley 38 from trolley rail 20.

With continuing reference to FIGS. 3 and 4, it will be noted that the trolley 38 is slidably positioned along the trolley rail 20 by way of primary wheels 46. These primary wheels are preferably formed an elastomeric material and/or a hardened synthetic rubber. In the preferred embodiment, the wheels are mounted on corresponding angled axles. These angled axles, in turn, are mounted to base 42 (FIGS. 5 and 8). The angle of the primary wheels matches the angle of side edges 26. This allows the angled wheels 46 to roll along the angled side edges 26 of the trolley rail 20. Again, a 45 degree angle is preferred, although other configurations are within the scope of the present invention.

The trolley 38 further includes secondary wheels which are mounted along an axle 52. The secondary wheels 48 are not mounted at an angle but rather extend downwardly from base 42. As noted more clearly in FIG. 7, secondary wheels 48 prevent base 42 from coming into contact with the base 22 of track 20. Namely, if upward forces are applied to trolley 38, secondary wheels 48 contact and roll upon base 22 of trolley rail 20 and otherwise prevent damage to the trolley 38.

The locking mechanism of trolley assembly 10 is described next. Namely, trolley 38 includes an axle 54 about which a toggle lock 56 pivots. Toggle lock 56 includes a curved body and preferably includes three discrete toggle orientations. In the first orientation, toggle lock 56 is substantially parallel to base 42. In the second orientation, the first end of toggle lock 56 is pivoted upwardly relative to the opposite end of the toggle lock. In the third orientation, the second end of toggle lock 56 is pivoted relative to the opposite end of toggle lock. In either of these two latter pivoted orientations, an end of the toggle lock 56 engages a corresponding interlock aperture 36. When either end of toggle lock 56 so engaged, trolley 38 is prevented from moving within trolley way 32. In the first orientation, neither end of lock 56 is engaged and trolley 38 is permitted to move freely within trolley way 32.

Lock 56 can be placed into one of the two locked orientations by way of an accelerometer or motion detector. Namely, when an occupant that is tethered to system 10 encounters forces beyond a predetermined level, lock 56 will engage interlock apertures 36 to prevent further movement of trolley 38. In this manner, the occupant is restrained from movement in response to the sudden movement of the vehicle. Thereafter, once the triggering event has passed, the user can depress a reset button (located either on the trolley 38 or upon the tether) to place lock 56 into its first unlocked orientation. This permits the user to again freely move within the interior of the vehicle.

Thus, in use, an aircrew member within the interior of a vehicle wears a harness assembly that is secured to a reel lock. The reel lock, in turn, is secured to the trolley 38 of trolley assembly 10. Upon encountering a sudden movement, such as would be experienced during a sudden loss of altitude, an accelerometer triggers the toggle lock 56 into either the second or third pivoted orientations. This, in turn, results in the trolley 38 becoming secured within trolley way 32 so as to restrain the aircrew member. The occupant is free to move again once a reset button (not shown) is depressed.

Second Embodiment

The second embodiment of the present invention is described next in conjunction with FIGS. 9-17. This embodiment likewise includes a trolley assembly that is adapted for use in conjunction with a reel lock or other type of overhead restraint.

As with the primary embodiment, trolley assembly 110 includes an elongated trolley rail 120. Trolley rail 120 has first and second ends with an intermediate extent within which a trolley 138 travels. Trolley rail 120 has a base portion 122 with opposed upstanding side edges 128, such that rail 120 has a generally c-shaped and opened cross-section. Additionally, side edges 128 are angled to form upper and lower trolley ways (134 and 136, respectively). More specifically, and as noted in FIG. 9, trolley rail 120 has a first width that forms the upper trolley way 134 and a second expanded width that forms the lower trolley way 136. Any references herein to "upper" and "lower" are defined in terms of the trolley's direction of travel and should not be interpreted as in any way limiting the scope of the present invention.

Trolley rail 120 can be mounted to a surface, such as an overhead surface within an aircraft or other vehicle, via a series of mounting apertures 124. Namely, rail 120 can be bolted to any substantially flat surface via conventional fasteners. Although most applications will be overhead, rail 120 can just as easily be floor mounted or side mounted. Moreover, multiple rails 120 can be arranged and mounted in end to end fashion to facilitate a greater range of movement. Locking apertures 126 are also included within base portion 122 for use in locking trolley 138 in a manner more fully described hereinafter. The number and spacing of the locking apertures 126 will vary depending upon the intended application. The locking apertures 126 optionally include bushings for increased strength.

Figure 11:
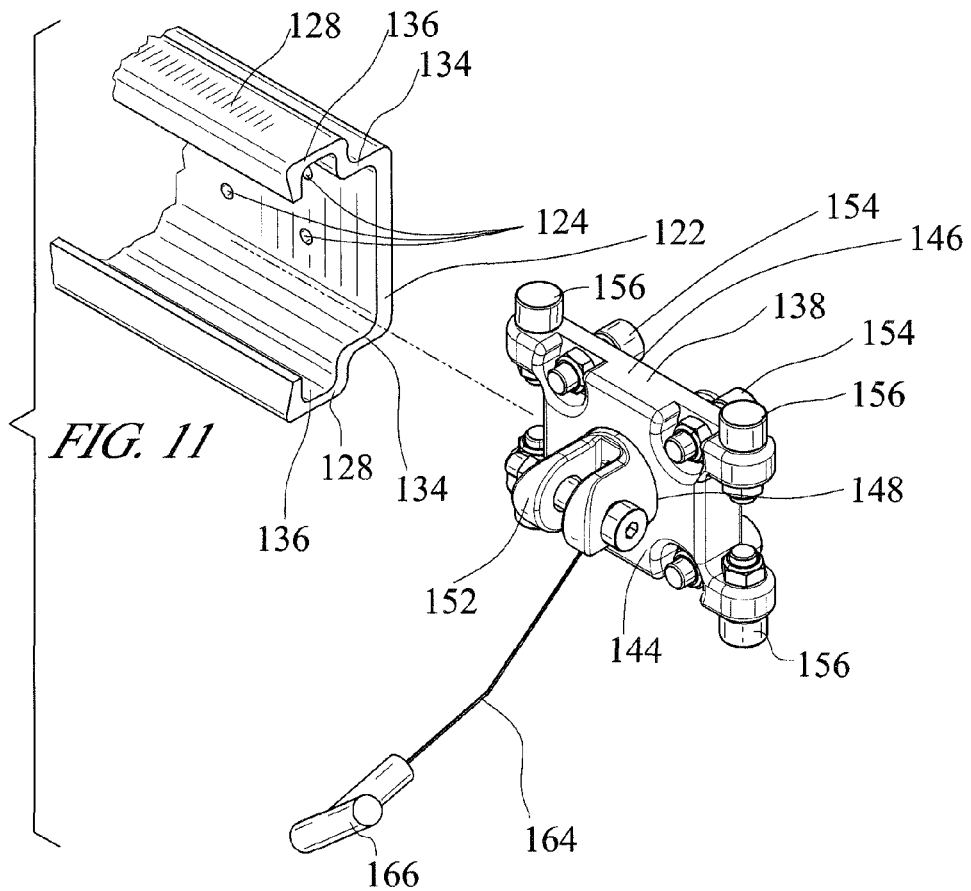
FIG. 11 is a view of the additional embodiment with the trolley separated from the trolley rail.
Figure 12:
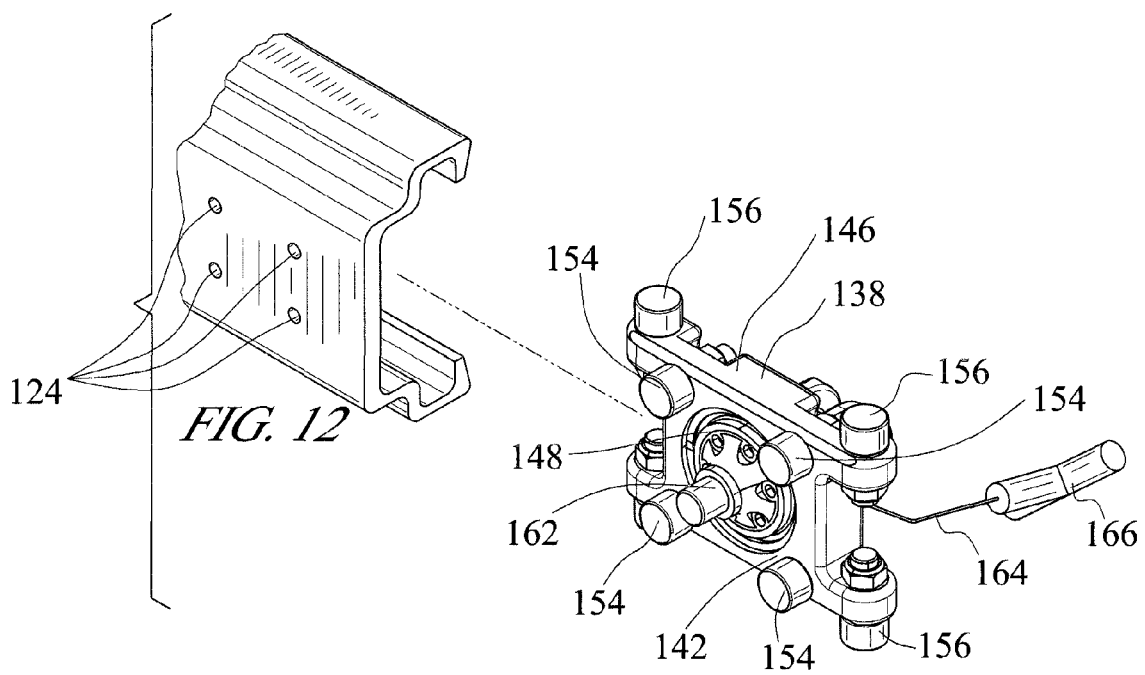
FIG. 12 is a view of the additional embodiment with the trolley separated from the trolley rail.
Figure 13:
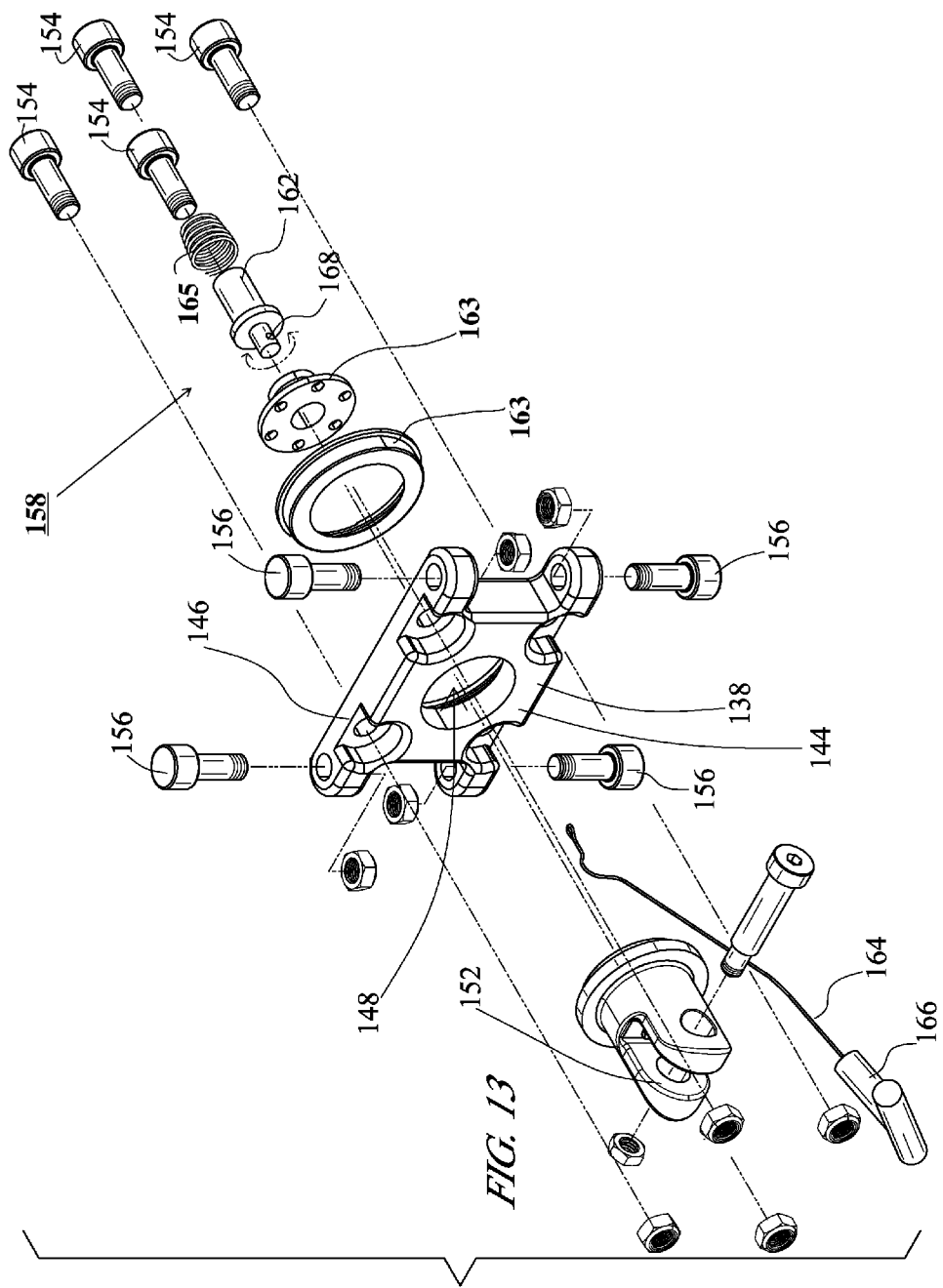
FIG. 13 is an exploded view of the trolley of the additional embodiment.

FIGS. 14 and 15 depict trolley 138 positioned within trolley rail 120. Trolley 138 can be inserted into rail 120 from either of the opened, opposing ends. The specific construction of trolley 138 is illustrated in FIGS. 11 and 12. As illustrated, trolley 138 is defined by a main body having opposed upper and lower surfaces (142 and 144, respectively) and an interconnected peripheral side edge 146. Trolley 138 further includes an enlarged aperture 148 that can be centered within the trolley body. Aperture 148 is used for mounting a yoke 152 and a retention mechanism 158 as described hereinafter. Mounting yoke 152 includes opposing flanges with associated apertures, whereby the flanges can be opened or closed by way of a threaded closing bolt. The apertures of the flanges can include rotatable bushings to provide for the movement of the closing bolt. Yoke 152 is preferably included to permit assembly 110 to be coupled to a supplementary restraint, such as a locking reel. A suitable reel is described in co-pending application Ser. No. 61/024,409 entitled "Reel Lock for Passenger Restraint Having Dual Locking Positions." The contents of this application are fully incorporated herein.

Trolley 138 is slidably retained within rail 120 by two sets of rotatable wheels. In the preferred embodiment, these wheels rotate about intersecting and perpendicular axes. A set of four wheels 154 are orthogonally mounted to the upper surface 142 of trolley 138 and four additional wheels 156 are orthogonally mounted to the side edge 146 of trolley 138. Although each set is disclosed as comprising four wheels, other arrangements are within the scope of the present invention. The wheels (154 and 156) are disclosed as being mounted via threaded connections. Wheels can also be constructed from any suitable materials readily appreciated by those skilled in the art.

A retention mechanism 158 is employed in locking trolley 138 at various positions along rail 120. Retention mechanism 158 includes a locking pin 162 that is secured within central aperture 148 of trolley 138. Locking pin 162 is biased by spring 165 and can be secured within aperture 148 via a central fitting 163. The fitting, in turn, is secured within aperture 148 via conventional fasteners. Locking pin 162 can be selectively positioned by way of a release cable 164 and handle 166. Release cable 164 is secured to locking pin 162 by way of a swivel mount 168 and eyelet. This accommodates the movement of the user within the vehicle. More specifically, by way of swivel 168, cable 164 is prevented from getting tangled within the webbing or the reel, or other components of the restraint system, as the occupant moves within the vehicle. Additionally, swivel 168 ensures that cable 164 is always on the opposite side of the webbing of the occupant harness.

Thus, in use, a user is secured via a harness and a locking reel in a known manner. The locking reel, in turn, is secured to trolley 138 via mounting yoke 152. The trolley 138 is secured within trolley rail 120 such that upper wheels 154 roll along upper trolley way 134 and the lower wheels 156 along lower trolley way 136. Trolley 138 can be fixed relative to trolley rail 120 by allowing pin 162 to engage one of the locking apertures 126. This is achieved by permitting the force of the spring 165 to insert locking pin 162 into one of the series of apertures 126. Thereafter a user can pull downwardly on the handle 166 and cable 164 to overcome the of spring 165 so as to remove locking pin 162 from locking aperture 126. With pin 162 out of position, trolley 138 is free to travel along rail 120. If a user no longer wishes to maneuver, they may release handle 166 and cable 164 so as to permit pin 162 to engage the next closest locking aperture 126. This is true even in situations where the user fails to adequately secure the pin 162 into a locking aperture 126.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A trolley assembly for use in conjunction with a passenger restraint system, the trolley assembly comprising:

a trolley rail having first and second ends and an intermediate extent therebetween, the trolley rail having a base portion and opposing side edges, the side edges being angled to form upper and lower trolley ways, the base portion including locking apertures and mounting apertures;

a trolley having upper and lower surfaces and an intermediate edge therebetween, a central aperture formed through the trolley, a mounting yoke interconnected to the central aperture and extending from the lower surface, the mounting yoke adapted to be removably secured to a locking reel, a set of four upper wheels orthogonally mounted to the upper surface and positioned within the upper trolley way, a set of four side wheels orthogonally mounted to the intermediate edge and positioned within the lower trolley way, whereby the upper and side wheels permit the trolley to be moved along the length of the trolley rail with the upper surface of the trolley in facing relation to the base portion of the rail;

a retaining mechanism interconnected to the central aperture, the retaining mechanism including a spring biased locking pin extending from the upper surface, the locking pin having a locked orientation wherein it is secured within a locking aperture of the base portion and unlocked orientation wherein it is removed from a locking aperture of the base portion, the pin being biased into the locked orientation, a release cable connected to the locking pin via a rotatable swivel, the release cable extending through the central aperture and being accessible by a user beneath the lower surface of the trolley;

wherein the trolley is allowed to freely move when the locking pin is in the unlocked orientation and is prevented from moving when the locking pin is in the locked orientation and wherein a user can pull on the release cable to bring the pin into the unlocked orientation.

2. A trolley assembly comprising:

a trolley rail having a base portion and upstanding side edges with first and second trolley ways, a series of locking apertures within the base portion;

a trolley having first and second surfaces and an intermediate side edge, a mounting member secured to the second surface, a first set of rollers and adapted to ride within the first trolley way, a second set of rollers adapted to ride in the second trolley way;

a retaining mechanism interconnected to the trolley and including a biased locking pin that is adapted to be selectively inserted into one of the locking apertures and thereby prevent the relative movement between the trolley and trolley rail, a handle for permitting a user to engage and disengage the locking pin.

3. The trolley as described in claim 2 wherein the first and second set of rollers rotate about intersecting axes.

4. The trolley as described in claim 2 wherein the first set of rollers are orthogonally mounted to the first surface and the second set of rollers are orthogonally mounted to the intermediate side edge.

5. The trolley as described in claim 2 wherein a total of four rollers are included in the first set and a total of four rollers are included in the second set.

6. The trolley as described in claim 2 wherein a cable interconnects the handle to the locking pin.

7. The trolley as described in claim 6 wherein a rotatable swivel interconnects the cable to the locking pin.

8. The trolley as described in claim 2 wherein the mounting member is a yoke that can be closed by a nut and bolt.

9. The trolley as described in claim 2 wherein the trolley rail is mounted upon a roof of a vehicle.

\* \* \* \* \*